(12) United States Patent
Emonds (10) Patent No.: US 6,289,540 B1
(45) Date of Patent: Sep. 18, 2001

(54) FIREFIGHTING TOOLS

(76) Inventor: Thomas K. Emonds, 8455 Treasure Rock Rd., Nehalem, OR (US) 97131

( * ) Notice: Subject to any disclaimer, the term of this patent is extended or adjusted under 35 U.S.C. 154(b) by 0 days.

(21) Appl. No.: 09/312,210

(22) Filed: May 14, 1999

(51) Int. Cl.[7] ................................................. A01B 1/00
(52) U.S. Cl. .............................. 7/116; 7/159; 30/308.1; 15/141.1
(58) Field of Search ............................... 7/116, 158, 159, 7/170; 81/20, 25, 26, 177.8, 177.9; 30/308.1; 15/141.1; 59/49, 53.5

(56) References Cited

U.S. PATENT DOCUMENTS

| | | | |
|---|---|---|---|
| 712,942 | * 11/1902 | Lawton | 30/308.1 |
| 835,405 | 12/1906 | Henkel . | |
| 1,055,044 | 3/1913 | Hollander . | |
| 2,830,307 | * 4/1958 | Worden | 7/116 |
| 3,473,712 | * 10/1969 | Genchi | 7/116 |
| 3,770,033 | 11/1973 | Gavillet et al. | 145/61 |
| 3,824,641 | 7/1974 | Shandel | 7/14.55 |
| 4,023,572 | 5/1977 | Weigand et al. | 128/305 |
| 4,155,149 | 5/1979 | Claesson | 29/78 |
| 4,287,623 | 9/1981 | Tarran | 7/158 |
| 4,476,597 | * 10/1984 | Gobbi | 7/159 |
| 4,700,420 | 10/1987 | Belanger | 7/114 |
| 5,105,493 | * 4/1992 | Lugtenaar | 7/116 |
| 5,297,306 | * 3/1994 | Shandel | 7/114 |
| 5,768,727 | * 6/1998 | Brainerd | 81/20 |
| 5,768,960 | * 6/1998 | Archuleta | 81/177.8 |

FOREIGN PATENT DOCUMENTS 248681   3/1926   (GB) .

* cited by examiner

Primary Examiner—Joseph J. Hail, III
Assistant Examiner—Joni B. Danganan
(74) Attorney, Agent, or Firm—Chernoff, Vilhauer, McClung & Stenzel, LLP (57) ABSTRACT

A set of firefighting tools for use in fighting forest fires and the like in different types of terrain and vegetation. An elongate handle is equipped with a releasably latching connector, and several different tool heads are attachable to the handle to perform various functions. One head has a pivotably attached shovel blade and is useful as a shovel, as a scraper or as a rake, when held in respective positions by a latching mechanism. Another tool head has a lightweight central body and replaceable oppositely directed axe and grub hoe blade portions. Yet a further tool head includes a resiliently flexible outer portion to which are fastened several flexible straps for beating out fires. Each head includes a socket adapted for emergency attachment to a simple wooden handle portion.

22 Claims, 8 Drawing Sheets

FIREFIGHTING TOOLS

BACKGROUND OF THE INVENTION

The present invention relates to fighting outdoor fires and particularly to a tool set useful for fighting fires in different types of terrain and vegetation.

With increasing movements of U.S. wildfire firemen from one geographic region to another the need for a better firefighting hand tool has evolved. Certain developments regarding such hand tools are disclosed in Lugtenaar U.S. Pat. No. 5,105,493, which discusses several of the problems faced in fighting wildfire fires in the naturally occurring vegetation.

For wildfire firefighters to be ready to do their work, they need to have all the necessary tools readily available when they are transported to a fire in any type of terrain likely to encountered in the geographical region where they are to be working. In places where heavy layers of grass roots and the like are found, shovels, grub hoes, and scrapers may not be very useful and fire may have to be beaten down to be extinguished. In other situations trees and brush need to be cut to prevent spreading of fire, and a firefighter may need an axe to be effective. However, cutting small low brush with an axe usually results in quick dulling of the axe blade as it encounters dirt and stones on the ground beneath thin branches.

Once flames have been extinguished the "black line" around a burned area has to be checked, using rakes, grub hoes, or similar tools, to discover, extinguish, and cool embers, to prevent rekindling of the fire. Tools such as the Pulaski firefighting tool, while popular, have a grub hoe blade whose weight is dominant over the opposite axe blade usually on the same handle. When such blades become worn through use, replacement of the entire Pulaski head is undesirably expensive. When firefighters have tried to improve the Pulaski tool by increasing the width of the grub hoe blade, the revised shape has made the tool more dangerous because of the increased unbalancing effect of the larger blade. Additionally, the prior art Pulaski tool has been undesirable heavy and therefore tiresome to use.

Adjustable shovels have been known previously and can be carried more safely than shovels with fixed blades. The adjustment mechanisms previously known, however, have been less secure than is desired.

While the multipurpose firefighting tool disclosed in earlier U.S. Pat. No. 5,105,493 included an effective direct contact tool for beating down flames, it is desired to have such a tool in a form which is less tiring to use for sever a 1 hours continuously.

What is desired, then, is an improved multipurpose tool for fighting wildfires that can be manufactured and maintained at a reasonable cost, that is not unduly heavy, that is well-balanced, and that is safe both in use and during transportation to a wildfire, including transportation by aircraft and during parachute drops.

SUMMARY OF THE INVENTION

The present invention attempts to provide answers to some of the aforementioned shortcomings of the prior art firefighting tools and provides a set of firefighting tools including a handle useable interchangeably with different heads.

A first aspect of the present invention provides an improved cutting tool head for use in a set of firefighting tools. Such a cutting tool head in one preferred embodiment includes a body defining a socket to receive an end of a handle, first and second blade support structures each including respective blade seats, and replaceable blades attached to the body and supported by the blade seats, each blade including an edge, with the edges being oriented perpendicular to each other, and with the tool head having a center of mass located within the socket defined by the body.

In one preferred embodiment of this aspect of the invention the blade seats are arranged for holding one blade in grub hoe position and the other in an axe blade position.

A second aspect of the present invention provides a shovel with an improved multi-position latching mechanism for holding a shovel blade in a selected position of rotation about a pivot axis oriented transversely with respect to the length of the tool handle.

In a preferred embodiment of this second aspect of the invention, a spring-loaded locking body is biased into engagement with a mating aperture when the shovel blade is in any of a plurality of useful positions of rotation about a pivot axis. In one embodiment of this aspect of the invention, the shovel blade can be latched either in a first position in which the shovel blade is oriented at an angle in the range of about 20° to 25° with respect to an extension of the tool handle, a second position in which the shovel blade is oriented approximately perpendicular to the handle, or a third position in which the blade lies closely alongside the handle.

In one preferred embodiment of this second aspect of the invention a swivel head included mounted on a handle extension is located between a pair of ears attached to the shovel blade, and an elongate locking and pivot shaft extends through the ears and the swivel head. The locking and pivot shaft is moveable longitudinally, but is not rotatable with respect to the swivel head, and a spring biases the shaft to a locking position in which a locking body portion of the shaft engages both the swivel head and an aperture in one of the ears and prevents the shovel blade from rotating about the pivot axis. The locking and pivot shaft may be moved longitudinally to an unlocked position in which the ears are rotatable about the pivot axis with respect to the shaft.

As a third aspect of the present invention a fairly stiff but resiliently flexible outer portion is provided in a handle for a direct contact fire extinguishing head including a number of flexible straplike members, so that the resiliently flexible outer portion of the handle can flex as the handle is swung during use, to impart speed to the extinguishing head and protect the user from mechanical shock from the impact when the direct contact fire extinguishing head comes into contact with a stationary object.

In one embodiment of this aspect of the invention the resiliently flexible outer portion of the handle has a length of at least about 10 inches.

It is a feature of one preferred embodiment of the invention that a female coupling for receiving a male handle coupling can also receive a wooden handle.

The foregoing and other objectives, features, and advantages of the present invention will be more readily understood upon consideration of the following detailed description of the invention, taken in conjunction with the accompanying drawings.

DETAILED DESCRIPTION OF THE PREFERRED EMBODIMENTS

Figure 1:
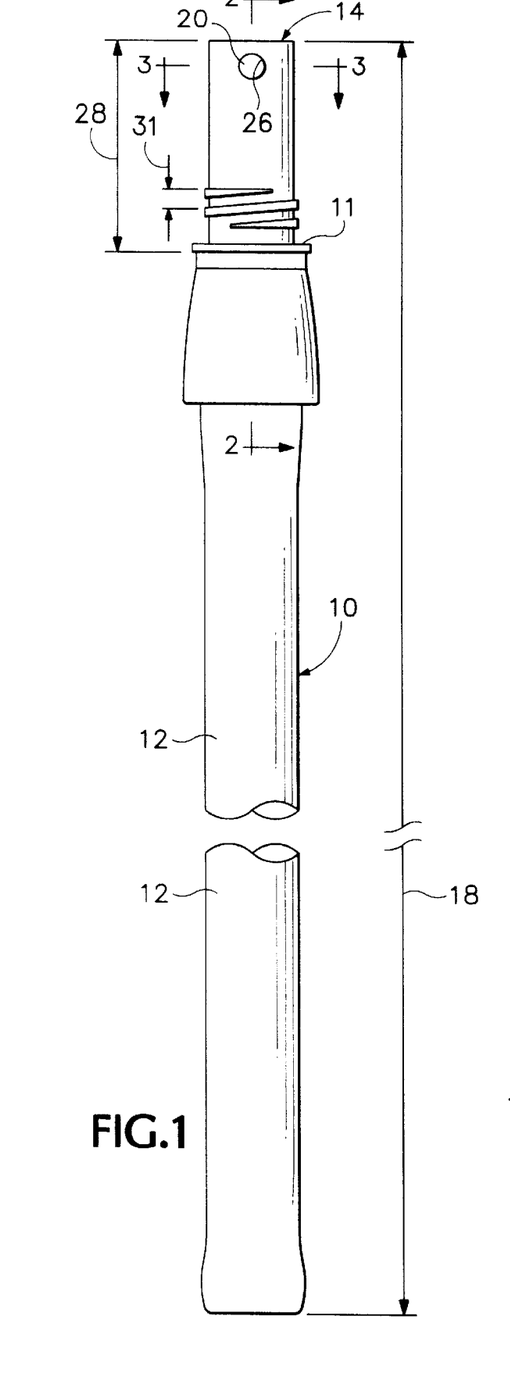
FIG. 1 is a side elevational view of an elongate handle for wildland fire fighting tool incorporating the present invention.
Figure 2:
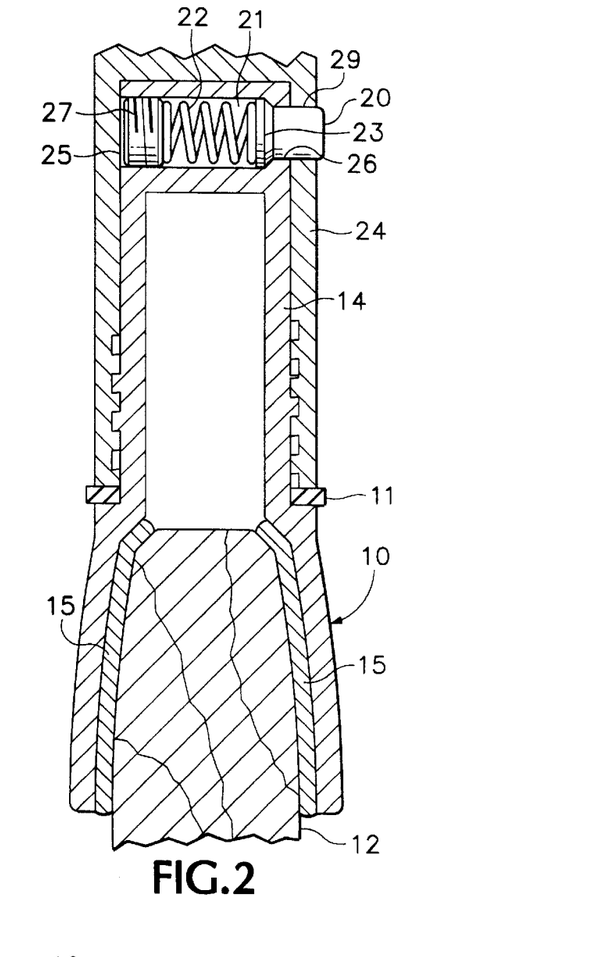
FIG. 2 is a sectional view, taken in the direction of line 2—2, of a portion of the handle shown in FIG. 1, together with a mating female coupling portion of a releasable latching connector for attaching a tool head to the handle shown in FIG. 1.
Figure 3:
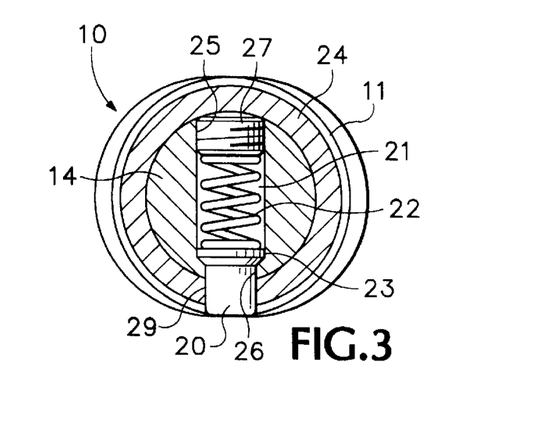
FIG. 3 is a sectional view taken along the line 3—3, showing a locking pin securing the mating female coupling portion of the latching connector shown in FIG. 2 to the portion of the connector attached to the handle.

Referring now to the drawings which form a part of the disclosure, in FIGS. 1 and 2 an elongate handle 10 has a male threaded connector portion 14 attached permanently to the outer end of the handle by a layer 15 of a suitable adhesive such as epoxy resin and a fastener such as rivet pin 16 extending through both the male connector portion 14 and the upper end of the handle. While the body 12 of the handle 10 may be of a synthetic fiber structure with a cushioning cover (not shown) the cost of such handle construction makes a handle body 12 of wood such as hickory or ash preferable.

Transfer of shock into the user's hands and body is reduced by placing a neoprene washer 11 between the mating surfaces of the male connector fitting 14 and the bottom of the female connector fitting 24. This neoprene washer also ensures a tight lock up connection between the male connector 14 and female connector 24 for all tool head attachments.

A preferred length 18 of the handle 10, including the length of the male threaded connector portion 14 which forms a portion thereof, is about 37 inches. The handle 10 is preferably brightly colored to be highly visible and thus unlikely to be lost at the site of a wildland fire.

The male threaded connector portion 14 of the handle 10 includes a spring biased plunger 20 located within a cavity 21. This round plunger 20 has a shoulder portion 23 with a slightly larger diameter. The entire plunger 20 passes through first end 25 of the cavity 21, but only the smaller diameter portion of the plunger 20 can slide onward through a hole 26 which is at the other end of the cavity 21 and is slightly smaller, causing the shoulder of 20 to stop all further forward movement into bore 26. Thus, the plunger 20 has an established radial protrusion length from the male connector portion 14 through hole 26. A compression spring 22 is located in the bore 25 behind the plunger 20. A threaded plug 27 behind the spring 22, secures the plunger, and keeps the spring 22 compressed.

The plunger 20 serves as a detent to retain the male threaded connector portion 14 fully mated with a female threaded connector portion 24 by extending outwardly through a corresponding bore 29 defined in the female connector portion 24.

Preferably, the male and female connector portions 14 and 24 define mating coarse helical threads such as a modified acme thread having a pitch 31 of at least ¼ inch, preferably approximately ½ inch, and a radial thread depth of at least about ¹⁄₁₆ inch. The threaded connector portions 14 and 24 can thus be mated and separated with a relatively small number of turns of the screw threaded portion, yet the length 28 of the mated portions of the male and the female connector portions 14 and 24 is great enough for the connector to carry the loads to which it will be subjected during use of the tool of the invention.

As may be seen in FIGS. 4–12, a multi-position adjustable shovel head 30, attachable to the handle 10, includes an elongate tubular handle extension 32, preferably of aluminum alloy or other light weight strong metal, attached to a female connector portion 24 . The handle extension 32 has a length 34 of about 16 inches between a female threaded connector portion 24 and a block-shaped head 50, made of tempered, aircraft quality, light weight alloy, in one preferred embodiment of the invention. In another version intended for use by firefighters dropped by parachute to the scene of a wildfire, the handle extension 32 could be significantly shorter and thus somewhat easier to carry. A shank 51 of the block-shaped head 50 is tubular and is press-fitted tightly inside an outer end of the tubular handle extension 32, to which it is fastened securely, as by a through-pin 53 and a suitable adhesive.

Figure 5:
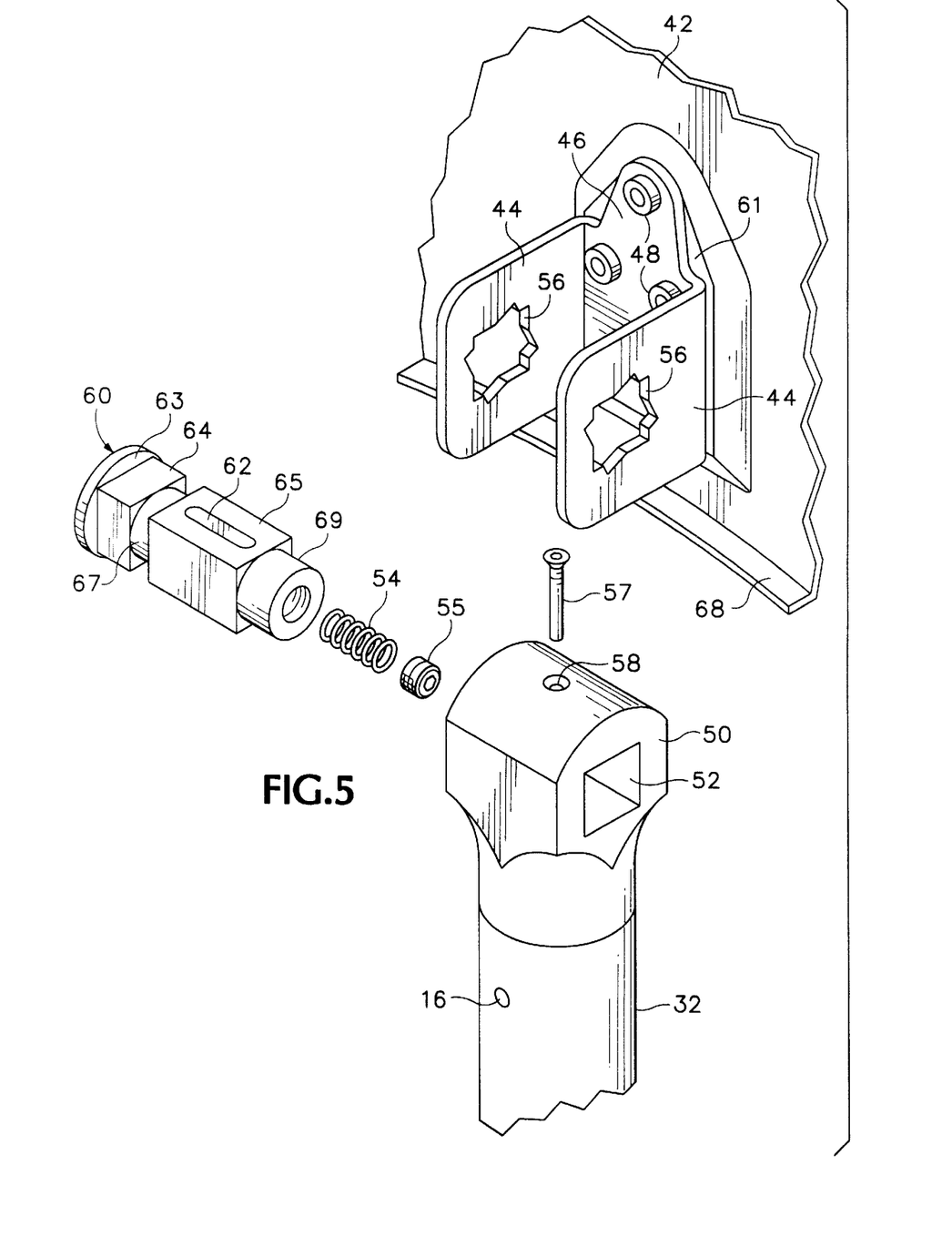
FIG. 5 is an exploded view of an adjustable locking shovel pivot and connector mechanism of the adjustable shovel blade head shown in FIG. 4.

A shovel blade 42 is connected pivotally to the handle extension 32 by a pair of parallel ears 44 extending from a mounting plate 46 fastened to the shovel blade 42 by fasteners such as rivets 48. The two ears 44 extend parallel with one another and are aligned with each other on opposite sides of the block-shaped head 50. Both ears 44 have latching holes 56 in the shape of eight-pointed stars.

Figures 6, 7:
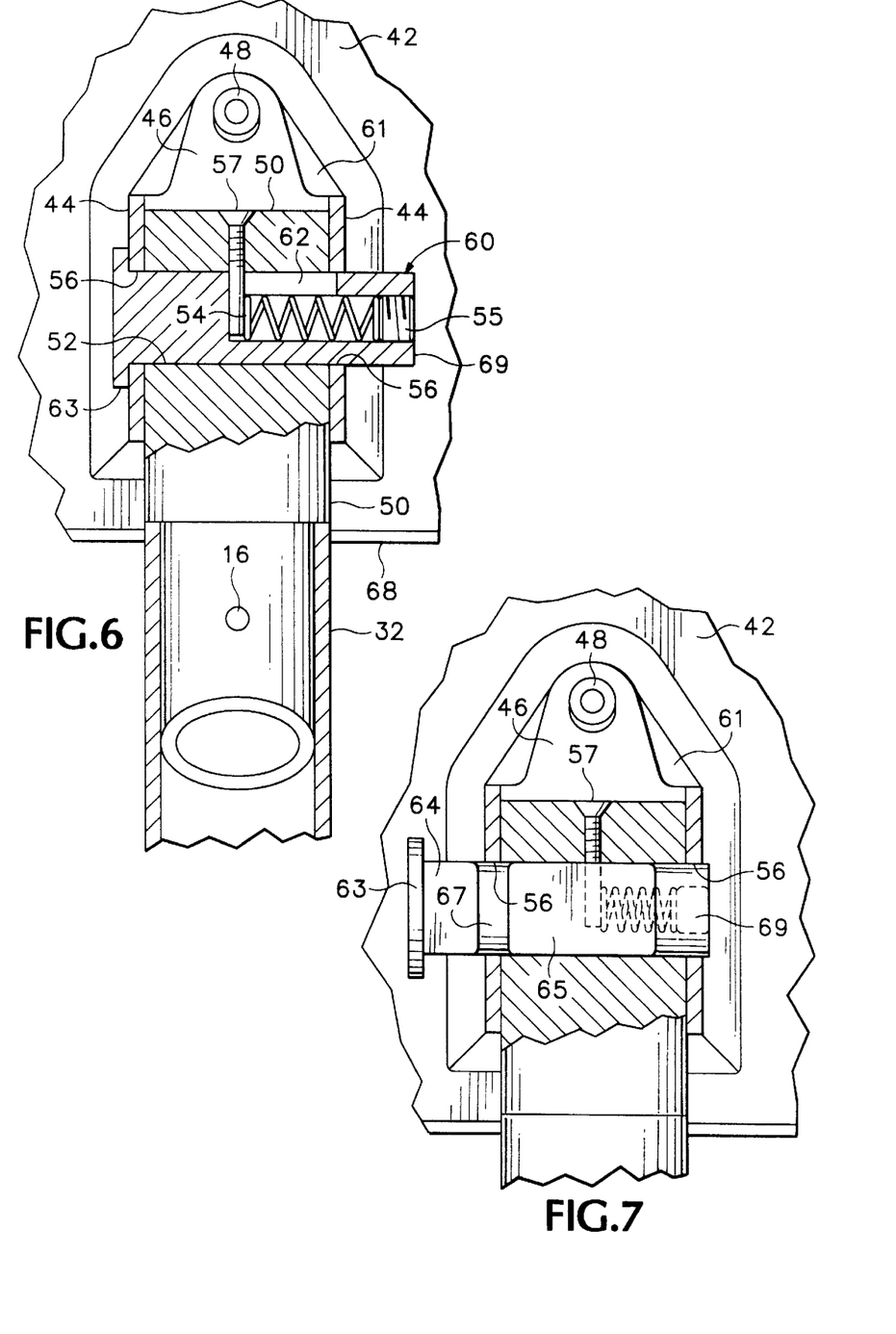
FIG. 6 is a sectional view, taken along line 6—6 of FIG. 11, showing the shovel blade pivoting mechanism with the locking and pivot shaft in the locking position.
FIG. 7 is a view similar to that of FIG. 6, showing the locking and pivot shaft in the unlocking position permitting the shovel blade to pivot with respect to the handle extension portion of the shovel blade head.
Figures 8, 9, 10:
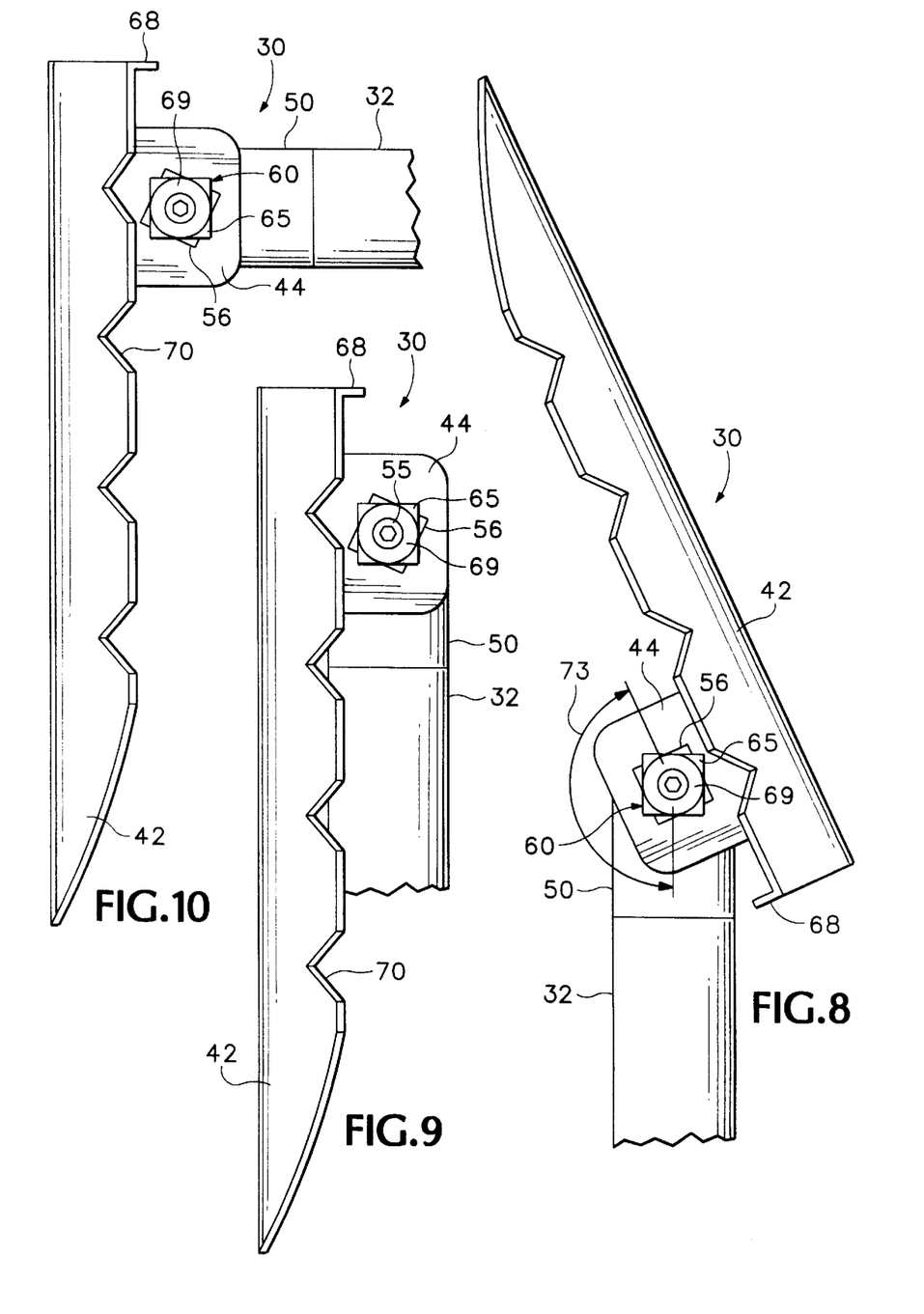
FIG. 8 is a side view taken along the line 8—8 of FIG. 4, showing the shovel blade held in the dirt lifting and throwing position relative to the handle extension portion of the shovel blade head.
FIG. 9 is a view similar to that of FIG. 8, showing the shovel blade in a storage and safe carrying position for use when the shovel head is attached to the handle shown in FIG. 1 and the tool is used as a safety staff to assist in cross-country travel.
FIG. 10 is a view similar to that of FIG. 8, showing the shovel blade held in a scraping, raking, and mixing position, perpendicular to the handle extension portion of the shovel blade head shown in FIG. 4.

A combination locking and pivot shaft 60 passes through both latching holes 56 and the square hole 52 through the block head 50. The combination locking and pivot shaft 60 has a large circular end 63, two square locking body portions 64 and 65, and two circular cylindrical pivot portions 67 and 69 whose diameters are preferably equal to the length of each side of the square sectional shape of the locking body portions 64 and 65. It will be understood that smaller portions 67 and 69 could also be used, so long as their shapes permit rotation in the holes 56. The combination locking and pivot shaft 60 defines a pivot axis 71, parallel with its length, for the shovel blade 42. A retaining member such as a locking screw 57 extends through a threaded hole 58 in the top center of the block head 50. The locking screw 57 is securely fitted in the threaded hole 58 and passes through a slot 62 in the locking and pivot shaft 60. This attaches the entire shovel blade portion 42, with attached mounting plate 46 and ears 44, to the block-shaped head 50. A latching spring 54, preferably a helical compression spring, although other configurations could be used, is located within a cavity 59 in locking and pivot shaft 60. A plug such as grub screw 55 threaded into the locking and pivot shaft 60 places the spring 54 under compression, urging locking and pivot shaft 60 to move a latching position as shown in FIG. 6 and to lock into four of the 8 corners in the star-shaped hole 56, as shown in FIGS. 6 and 8. Preferably, the screw 55 is peened, or a thread locking compound is used, to prevent the screw 55 from backing out unintentionally.

To release the locking and pivot shaft 60 from the eight-pointed star-shaped holes 56 of the shovel ears 44 pressure is applied with the thumb to the area around the screw 55, moving the combined locking and pivot shaft 60 longitudinally and compressing the spring 54 against the locking screw 57, thus moving the locking body portions 64 and 65 free of the star-shaped holes 56. The ears 44 can then rotate on the pivot shaft portions 67 and 69. The entire shovel blade 42 and ears 44 can be pivoted about the cylindrical parts 67 and 69 of the locking and pivot shaft 60 with respect to the block-shaped head 50 and the associated handle extension 32. When the shovel blade 42 has been rotated to the required one of the several available positions, the user simply releases the pressure on the locking and pivot shaft 60 at the screw 55. The spring 54 will then move the locking and pivot shaft 60 longitudinally until at least one of the locking body portions 64 and 65 enters a respective hole 56 and engages one of the ears 44. The locking and pivot shaft 60 thus automatically locks and stays locked engaging both the square hole 52 and the star-shaped holes 56 until the user chooses to select another position of shovel blade 42 by again moving the locking and pivot shaft 60 to the unlatching position shown in FIG. 7 and rotating the shovel blade 42 about the central axis of the locking and pivot shaft 60.

Figure 4:
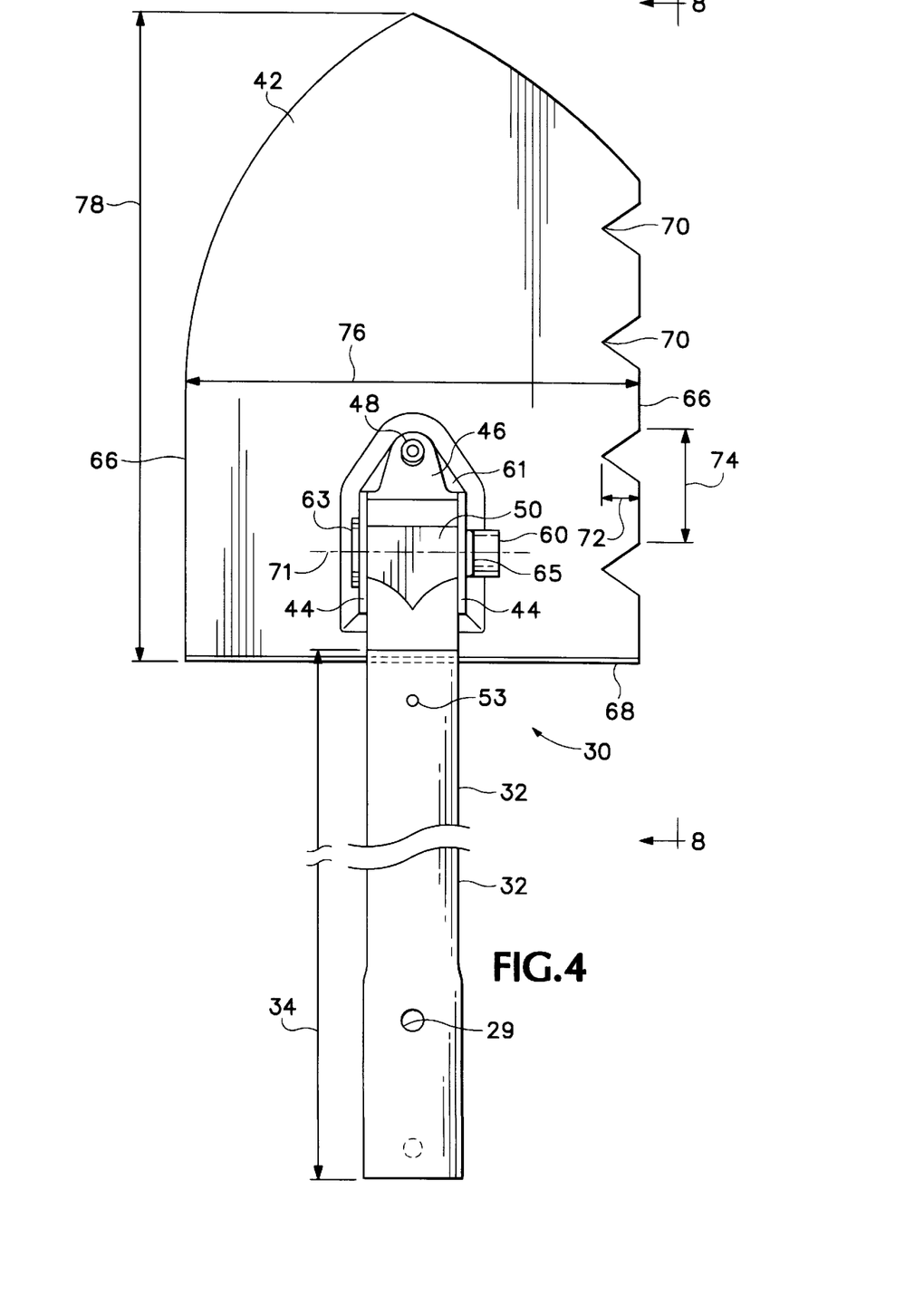
FIG. 4 is a view of an adjustable shovel blade head for attachment to the handle shown in FIG. 1 by the latching connector shown in FIG. 2.
Figure 11:
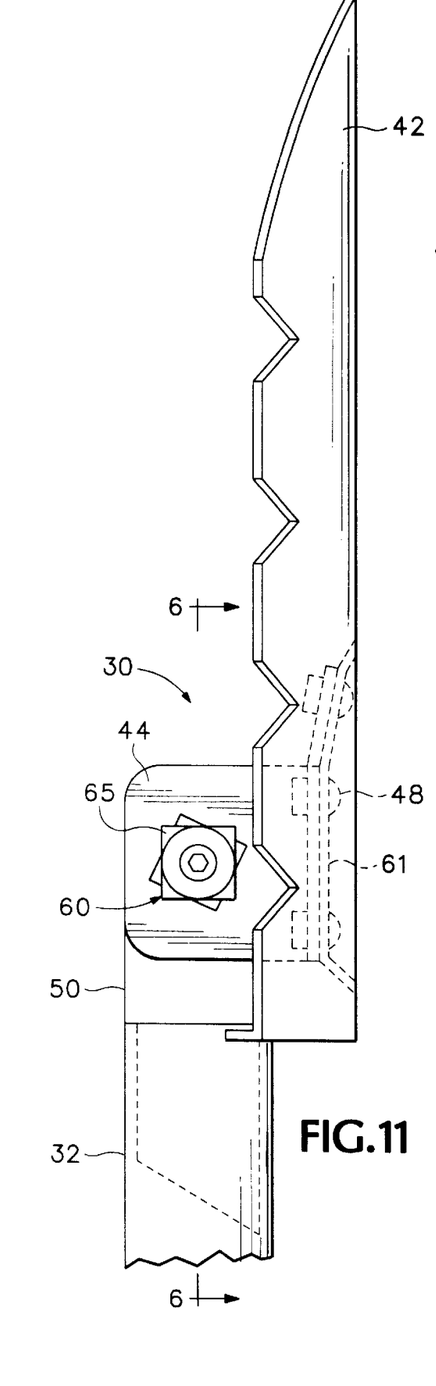
FIG. 11 is another view similar to that of FIG. 8, showing the shovel blade in a straight-in-line position with respect to the handle extension position of the shovel blade head shown in FIG. 4.
Figure 12:
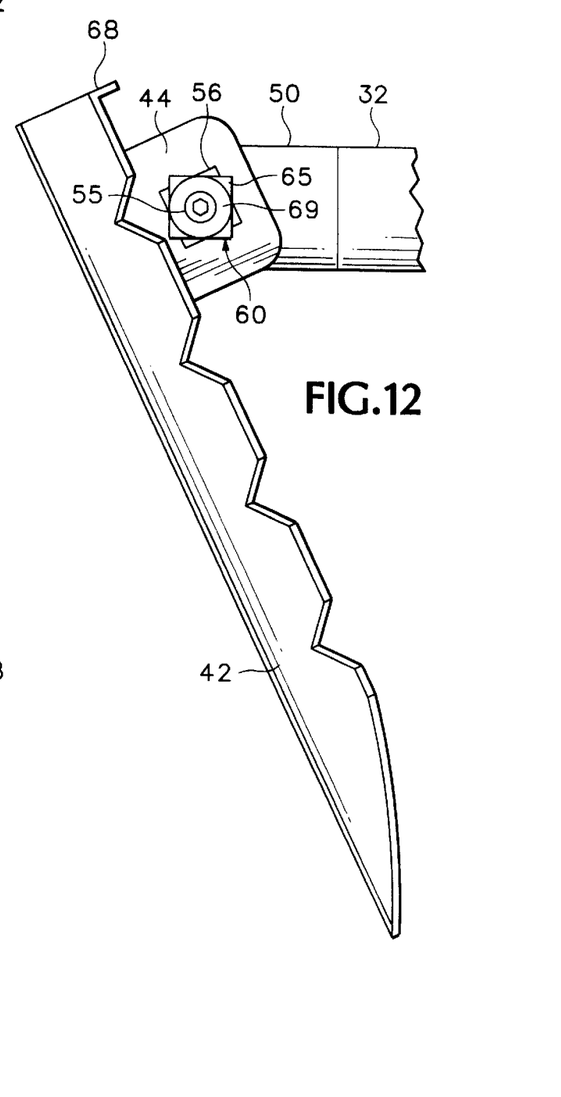
FIG. 12 is a further view similar to that of FIG. 8, showing the shovel blade in an inwardly angled hoe-like orientation with respect to the handle extension portion of the shovel blade head shown in FIG. 4.

Thus, the shovel blade can be held in a first, or ordinary shovel, position extending away from the handle extension 32 as shown in FIG. 4 and FIG. 8, at a preferred angle of approximately 15–30°, and preferably 20–25°, as shown in FIG. 5. The mounting plate 46, in the dirt lifting and throwing mode, is oriented diagonally with respect to the handle extension 32. The eight-pointed star shape of the holes 56 is defined by the superimposed positions of the square locking body portions 64 and 65 displaced angularly by the angle 73 between the positions of the shovel blade 42 in the ordinary shovel position shown in FIG. 8 and the folded position alongside the handle extension 32 as shown in FIG. 9. Because of the square shape of the locking bodies 64 and 65 the shovel blade 42 can similarly also be locked in the positions 90° or 180° away from those positions, as shown in FIGS. 10, 11 and 12. With the shovel blade 42 locked in either one of the positions shown in FIGS. 11 and 12, the shovel blade can be used for various tasks. It will be understood also that the locking and pivot shaft 60 could be made to be latched in and released from various positions of rotation in the head 50, as by use of a spring mounted on one of the ears 44.

As shown in FIG. 10, the lateral edges 66 of the shovel blade 42 are oriented perpendicular to the handle extension 32. In this mode the shovel blade 42 is useable as a scraper or rake with teeth separated by notches 70 defined in at least one of the lateral edges 66. In one embodiment of the tool each of the notches has a depth 72 of about 1 inch and a width of 1 inch and the notches 70 are spaced apart from each other at an interval 74 of about 2 inches In a preferred embodiment of the invention the shovel blade has a width 76 of about 8½ inches and a length 78 of about 11 inches. This generous width gives the shovel blade 42 a better capacity than a council tool or fire rake for moving loose fluffy leaves.

In forming the shovel blade 42 a permanent concave shape is pressed into the blade to help hold and move dirt in and from the blade while in use. Similarly provided is a permanent oppositely directed impression that tapers off and points toward the shovel blade point 67. This permanent impression is pressed into the rear, center portion of shovel blade 42. The pointed concave impression defines a platform 61 that structurally increases the strength of the shovel blade 42. The raised yet flat platform 61 offers a stable spot to receive and attach the baseplate 46 to the shovel blade 42. Also, the back, or rear margin, of the shovel blade 42 has a small, ¼ inch, 90 degree, permanent, upwardly bent rear flange 68 of the shovel blade 42. This flange 68 functions as a dirt holding feature, and also offers a dependable brake mechanism to dig into the ground to create drag for cross country travelers dealing with difficult, steep, and slippery terrain with the shovel blade 42 in the position shown in FIG. 9.

It will be appreciated that in keeping with the present invention other noncircular shapes for the locking bodies 64 and 65 could also be used, with corresponding shapes for the locking holes 56 in the ears 44, to make it possible to lock the shovel blade 42 in more than one position with respect to the handle extension 32.

Figures 13, 14:
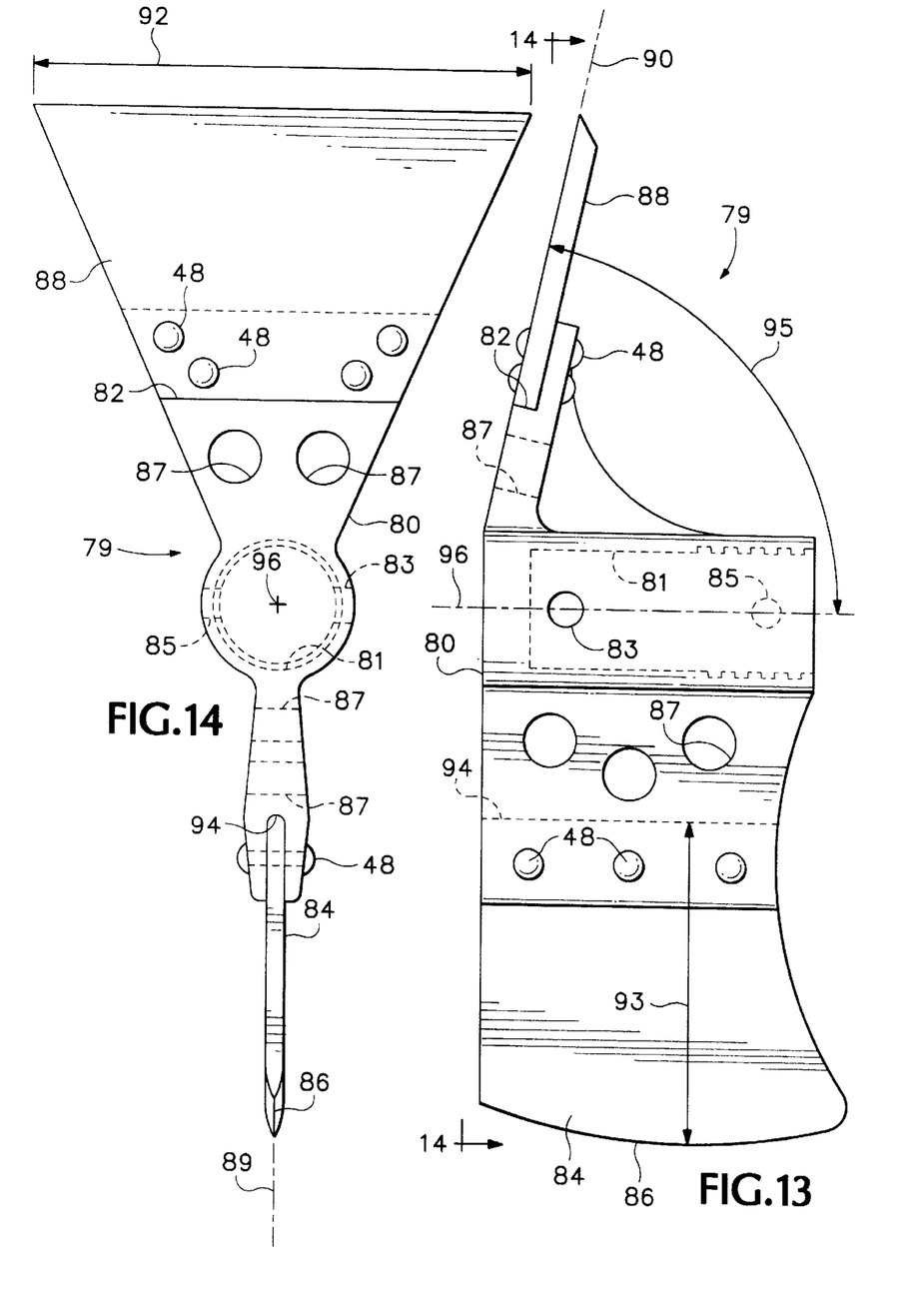
FIG. 13 is a side view of a combination cutting and grubbing head with replaceable blades, that is attachable to the elongate handle shown in FIG. 1.
FIG. 14 is a view of the combination cutting and grubbing head shown in FIG. 13, taken in the direction of line 14—14.

A cutting and grubbing combination head 79 shown in FIGS. 13 and 14 has a main body 80. A female threaded connector portion or socket 81 is an integral part of the main body 80 and is similar to the female connector portion 24 of the shovel head 30, and like the female connector 24 includes a radial locking pin bore 83 to receive the plunger 20 when mated to the handle 10. The main body 80 may be manufactured by well-known methods, as by being formed as a casting and further shaped by a CNC milling process. The combination cutting and grubbing head 79, like the adjustable shovel head 30, can be attached removably to the elongate handle 10 by means of the female connector portion 81. Likewise, the head 79 can also be mounted onto an emergency handle formed from local vegetation such as a green sapling and then secured into the socket 81 with simple wood screws inserted and tightened into the wooden emergency handle through the locking plunger hole 83 and a screw hole 85 located on opposing sides and at different heights from each other on the female connector portion 81.

An axe blade 84 has an edge 86, directed away from the female connector portion 81 and is best used for chopping and cutting larger vegetation such as tree limbs, brush stems, and large roots. The axe blade 84 is preferably of high carbon steel, such as National 1040/1050 heat treated to a Rockwell C Scale Hardness of 46–50. This axe blade 84 is designed to be replaceable after it has become worn. It is held fixed securely, in a blade seat defined by a pair of side members of a full blade length groove or channel 94 in the body 80, by several rivets 48 and defines an axe blade plane 89. Between the axe blade seat or channel 94 and the female connector or socket 81 are several balance and weight reduction holes 87 that pass through a fin portion of the main body casting 80.

Extending away from the socket 81 in the opposite direction from the axe blade 84 is a grub hoe blade portion 88. The grub hoe blade 88 is best used for trenching and clearing tough ground cover down to mineral soil. This grub hoe blade 88 lies generally in a plane 90 perpendicular to the plane 89 of the axe blade 84 and at an angle 95 of about 70° to the central axis 96 of the female connector or socket 81 and the handle 10. There is a blade seat in the form of a very noticeable shelf 82 or step that accepts the grub hoe blade 88. At the shelf 82, the grub hoe blade 88 is fastened to the portion 82 of the main casting or body 80 of the combination head 80 by several rivets 48, for like the axe blade 84, the grub hoe blade 88 is designed to be replaceable once as it is worn or damaged.

As may be seen in FIG. 14, the grub hoe blade portion 88 has a width 92 which may be chosen to fit the particular intended use of the head 79. In one preferred embodiment of the invention the width 92 of blade 88 is 7 inches while a length 91 the of blade 88 is 4 inches, and this size can be provided with the weight of the entire head 79 only 2.5 pounds. However, for smoke jumpers and wilderness rangers a more compact grub hoe blade 88 has a width 92 of some 5 inches and length 91 is 3 inches. The desired balance point for the axe and grub hoe combination head 79 lies generally on the central axis 96 of the female connector portion of socket 81. Thus, whatever width 92 is decided upon for grub hoe blade 88, it is vital that a matching axe blade 84 be used for the purpose of safe balance. When the 7 inch wide 92 grub hoe blade is decided upon, a corresponding 4 inch length 85 for axe blade 84 is used. When grub hoe blade 88 has a blade width 92 of 5 inches the length 91 for blade 88 should be 3 inches, and the corresponding length 93 of axe blade 84 should be 3 inches.

Grub hoe blade 88 preferably is made of the same material as is used for the axe blade 84, such as National 1040/1050 steel, heat treated to a Rockwell C Scale Hardness of 46–50.

Figure 15:
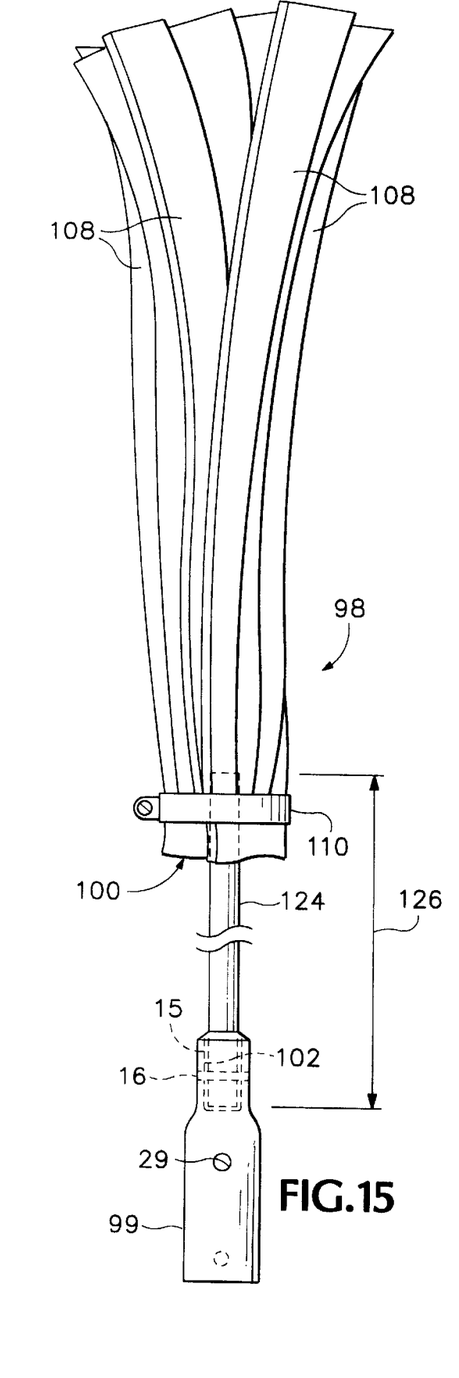
FIG. 15 is a side elevational view of a fire extinguishing, direct contact fire beater head including a resiliently flexible rod, for attachment to the elongate handle shown in FIG. 1.
Figure 16:
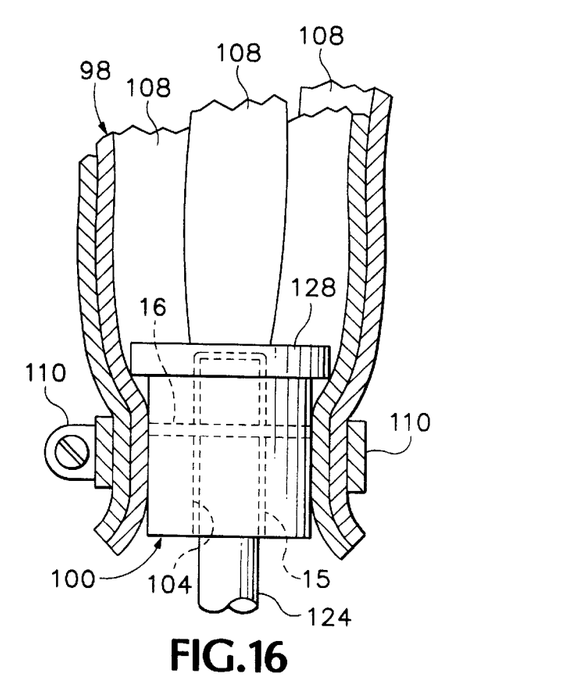
FIG. 16 is a partially cutaway view showing a portion of the fire extinguishing, direct contact head shown in FIG. 15, at an enlarged scale, and showing the manner of attachment of beater straps and the manner of fastening the metal end parts to the flexible rod.

A fire extinguishing direct contact head 98, or fire beater, shown in FIGS. 15 and 16 includes at one end a female connector portion 99 corresponding to the female connector portion 24 of the shovel head 30. A strap holder portion 100 including larger diameter terminal portion 128 is connected to the female connector portion 99 by a flexible and tough extension and connector rod 124. Preferred materials for the extension and connector rod 124 are ⅝ inch diameter polycarbonate round rod, or ⅝ inch Nylon (polyamide) round rod, although other strong, resiliently flexible materials could also be used. The preferred length 126 of rod 124 is about 24 inches with some smoke jumpers preferring a length 126 of 10 or 12 inches for the rod section 124 so as to carry these beaters 98 in their jump suit leg pockets for immediate use upon landing at a wildfire.

The extension and connector rod 124 is attached to the female connector portion 99 by the use of an epoxy glue 15 spread along a 2 inch section of one end of the extension and connector rod 124 and then inserted into a 2 inch long, slightly larger bore 102 in the female connector portion 99. A fastener such as a long rivet pin 16 reinforces the adhesive attachment of rod 124 to female connector portion 99. The strap holder portion 100 of the beater head 98 also has a 2 inch long bore 104 that receives a 2-inch opposite end section of the extension/connector rod 124 and an epoxy adhesive layer 15 reinforced by a long rivet pin 16 as shown in FIG. 16.

A flared larger diameter terminal portion 128 of the strap holding portion 100, shown in FIG. 16, serves as a safety stop or lock feature. A plurality of narrow elongate flat straps 108 of flexible sheet material are fastened to the terminal portion of the strap holder portion 100 of the direct contact fire extinguishing head 98. A hose clamp 110 is placed so as to encircle the flexible material behind the flared terminal portion 128, and is tightened to form the fire extinguishing direct contact head or fire beater head 98, in the same manner as disclosed in U.S. Pat. No. 5,105,493, the disclosure of which is hereby incorporated herein by reference.

Figure 17:
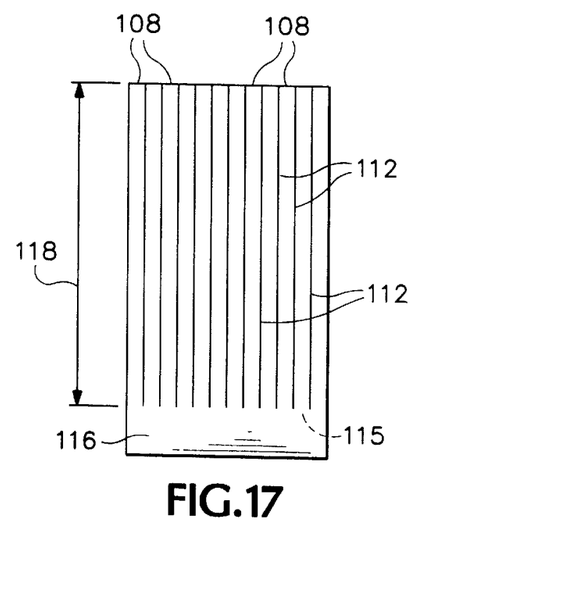
FIG. 17 is a view of a sheet of material defining straps used in the fire extinguishing, direct contact head.

Preferably, as shown in FIG. 17, the straps 108 are formed by parallel cuts 112 defined in a sheet 114 of fabric reinforced synthetic rubber, such as a three ply fabric reinforced neoprene flat belt material. Such material is durable enough to be used for several seasons of beating out fires in tough turfed grasses, moss, lichens, tundra, taiga, swamps, organic peat, or vegetation that is too difficult to be scraped away efficiently down to mineral soil as a way to fight wildfires. Preferably, the cuts 112 extend to an imaginary line 115 defining a marginal header portion 116 about 2 inches wide. Each of the straps 108 has a length 118 which is preferably about 22–24 inches, leaving the marginal header portion 116 to be wrapped around the end portion of the strap holding portion 100 behind the flared terminal portion 128. The preferred width of straps 108 is 1½ inches with a thickness of ⅛ inch.

Thus, with a extension and connector rod 124 with a length 120 of 24 inches attached to the handle 10, the fire fighter enjoys a beating tool with over 7 feet of reach. This gives the fire fighter a comfortable position of use where the face of the fire fighter is well away from flame.

This new tool, with its detachable adjustable shovel head 30, combination axe and grub hoe head 79, and fire beater head 98, is thus far more efficient than traditional fire tool previously offered to wildland fire fighters.

The terms and expressions which have been employed in the foregoing specifications are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A combination tool head, comprising:
   (a) a body defining a socket for receiving an end of a handle, the socket defining a central axis and the body including:
      (i) a first blade support structure including a first blade seat defining a first blade plane oriented substantially parallel with said central axis;

(ii) a second blade support structure including a second blade seat defining a second blade plane oriented substantially normal to said first blade plane;

(b) a first blade located in said first blade plane and mounted on said first blade seat;

(c) a second blade located in said second blade plane and mounted on said second blade seat; and (d) wherein said tool head has a center of mass located on said central axis and within said socket.

2. The tool head of claim 1 wherein said first blade is an axe blade and said second blade is a grub hoe blade.

3. The tool head of claim 1 wherein said first blade seat includes a fin extending from said socket, said fin including a pair of side members defining a channel, said first blade being received snugly within said channel.

4. The tool head of claim 1 wherein said body is of a lightweight material and said first and second blades are of steel.

5. The tool head of claim 1 including a plurality of rivets attaching at least one of said first and second blades to said body.

6. The tool head of claim 1 wherein said socket defines a female screw thread.

7. The tool head of claim 1 wherein said second blade has a width of at least 5 inches and said head has a weight of about 2.5 pounds.

8. The tool head of claim 1 wherein said socket includes a wall defining at least two radially directed handle locking holes.

9. The tool head of claim 1 wherein said center of mass is located within said socket.

10. A firefighting tool, comprising:

(a) an elongate handle having a near end, an opposite outer end, and a terminal portion associated with said outer end;

(b) a fire extinguishing direct contact head including a plurality of elongate flexible strap members attached to and extending flexibly away from said terminal portion of said handle; and (c) wherein said handle includes a substantially inflexible inner portion and a resiliently flexible outer portion extending from said inner portion to said terminal portion.

11. The firefighting tool of claim 10 wherein said flexible outer portion is at least about 10 inches long.

12. The firefighting tool of claim 11 wherein said handle includes a coupling releasably interconnecting said inner portion with said flexible outer portion.

13. The firefighting tool of claim 10 wherein said resiliently flexible outer portion of said handle is a rod of a polycarbonate material.

14. The firefighting tool of claim 10 wherein said resiliently flexible outer portion of said handle is of a polyamide material.

15. In a firefighting tool including:

an elongate handle having a length;

a shovel blade defining a rear margin and having a pair of opposite lateral edges; and a shovel blade mounting assembly attaching said shovel blade to said handle and defining a pivot axis extending transversely with respect to the length of said handle and generally parallel with said rear margin of said shovel blade, said shovel blade being pivotable about said pivot axis between a first position in which said shovel blade extends away from said handle and said lateral edges extend generally at an angle in the range of about 15°–30° with respect to an imaginary extension of said handle, and a second position in which said lateral edges extend substantially perpendicular to said handle, the improvement comprising:

(a) a latching mechanism included in said mounting assembly, for holding said shovel blade in a selected one of said first and second positions, said latching mechanism including:

(i) a pair of parallel ears extending from a first one of said handle and said shovel blade, each of said ears defining a shaft-receiving aperture therethrough and at least one of said shaft-receiving apertures being a noncircular latching hole;

(ii) a swivel head extending from the other one of said handle and said shovel blade and located between said parallel ears, said swivel head defining a through-hole;

(iii) a combined locking and pivot shaft extending through said through-hole;

(iv) a spring acting on said combined locking and pivot shaft and thereby biasing said combined locking and pivot shaft toward a latching position with respect to said ears and said swivel head;

(v) said combined locking and pivot shaft including at least one noncircular locking body portion engaged with said swivel head; and (vi) said locking and pivot shaft having a length and being movable longitudinally, between said latching position, in which said locking body portion of said locking and pivot shaft engages said through-hole in said swivel head and said latching hole of at least one of said ears, thereby interconnecting said swivel head with said at least one of said ears and thereby preventing said swivel head and said ears from moving about said pivot axis with respect to each other when said shovel blade is in one of said first and second positions with respect to said handle, and an unlatching position, in which said locking and pivot shaft is displaced from said latching position interconnecting said swivel head with said at least one of said ears, and said ears and said swivel head are free to rotate with respect to each other about said pivot axis, so that said shovel blade is free to rotate between said first and second positions.

16. The firefighting tool of claim 15 wherein said locking body and said through-hole have related shapes preventing said locking and pivot shaft from rotating in said through-hole when said locking and pivot shaft is in either of said latching and unlatching positions; and wherein said ears are free to rotate about said locking and pivot shaft when said locking and pivot shaft is in said unlatching position.

17. The firefighting tool of claim 15 wherein at least a portion of said locking and pivot shaft is of square cross-section and said latching hole of at least one of said ears has a shape defined at least in part by portions of at least two superimposed squares each having a center located on said pivot axis, each of said two superimposed squares being located in a different position of rotation about said pivot axis.

18. The firefighting tool of claim 17 wherein said position of rotation of each of said superimposed squares corresponds to a respective one of said first and second positions of said shovel with respect to said handle.

19. The firefighting tool of claim 15 wherein said shovel blade is also pivotable to a folded position parallel with and alongside said handle extension when said pivot and locking shaft is in said unlatching position and wherein, as part of said latching mechanism, said swivel head and at least one of said ears define apertures in which said locking body is received when said locking and pivot shaft is in said latching position when said shovel is in said folded position.

20. In a firefighting tool including:

an elongate handle having a length;

a shovel blade defining a rear margin and having a pair of opposite lateral edges; and a shovel blade mounting assembly attaching said shovel blade to said handle and defining a pivot axis extending transversely with respect to the length of said handle and generally parallel with said rear margin of said shovel blade, said shovel blade being pivotable about said pivot axis between a first position in which said shovel blade extends away from said handle and said lateral edges extend generally at an angle in the range of about 15°–30° with respect to an imaginary extension of said handle, and a second position in which said lateral edges extend substantially perpendicular to said handle, the improvement comprising:

(a) a latching mechanism included in said mounting assembly, for holding said shovel blade in a selected one of said first and second positions, said latching mechanism including:

(i) a pair of parallel ears extending from a first one of said handle and said shovel blade, each of said ears defining a shaft-receiving aperture therethrough and at least one of said shaft-receiving apertures being a noncircular latching hole;

(ii) a swivel head extending from the other one of said handle and said shovel blade and located between said parallel ears, said swivel head defining a through-hole;

(iii) a combined locking and pivot shaft extending through said through-hole;

(iv) a spring acting on said combined locking and pivot shaft and thereby biasing said combined locking and pivot shaft toward a latching position with respect to said ears and said swivel head;

(v) said combined locking and pivot shaft including at least one noncircular locking body portion engaged with said swivel head; and (vi) said locking and pivot shaft having a length and being movable longitudinally, between said latching position, in which said locking body portion of said locking and pivot shaft engages said through-hole in said swivel head and said latching hole of at least one of said ears, thereby interconnecting said swivel head with said at least one of said ears and thereby preventing said swivel head and said ears from moving about said pivot axis with respect to each other when said shovel blade is in one of said first and second positions with respect to said handle, and an unlatching position, in which said locking and pivot shaft is displaced from said latching position interconnecting said swivel head with said at least one of said ears, and said ears and said swivel head are free to rotate with respect to each other about said pivot axis, so that said shovel blade is free to rotate between said first and second positions, said locking body being slidably disposed in said through-hole but said locking body and said through-hole having related shapes preventing said locking and pivot shaft from rotating in said through-hole when said locking and pivot shaft is in either of said latching and unlatching positions, and wherein said ears are free to rotate about said locking and pivot shaft when said locking and pivot shaft is in said unlatching position, and wherein said locking and pivot shaft defines a spring cavity and an opening communicating with said spring cavity, and wherein a retaining member extends through said opening into said spring cavity from said swivel head to a position adjacent said spring.

21. In a firefighting tool including:

an elongate handle having a length;

a shovel blade defining a rear margin and having a pair of opposite lateral edges; and a shovel blade mounting assembly attaching said shovel blade to said handle and defining a pivot axis extending transversely with respect to the length of said handle and generally parallel with said rear margin of said shovel blade, said shovel blade being pivotable about said pivot axis between a first position in which said shovel blade extends away from said handle and said lateral edges extend generally at an angle in the range of about 15°–30° with respect to said handle, and a second position in which said lateral edges extend substantially perpendicular to said handle, the improvement comprising:

(a) a latching mechanism included in said mounting assembly, for holding said shovel blade in a selected one of said first and second positions, said latching mechanism including:

(i) a pair of parallel ears extending from a first one of said handle and said shovel blade, each of said ears defining a shaft-receiving aperture therethrough and at least one of said shaft-receiving apertures being a noncircular latching hole;

(ii) a swivel head extending from the other one of said handle and said shovel blade and located between said parallel ears, said swivel head defining a through-hole;

(iii) a combined locking and pivot shaft extending through said through-hole;

(iv) a spring acting on said combined locking and pivot shaft and thereby biasing said combined locking and pivot shaft toward a latching position with respect to said ears and said swivel head;

(v) said combined locking and pivot shaft including at least one noncircular locking body portion engaged with said swivel head; and (vi) said locking and pivot shaft having a length and being movable longitudinally, between said latching position, in which said locking body portion of said locking and pivot shaft engages said through-hole in said swivel head and said latching hole of at least one of said ears, thereby interconnecting said swivel head with said at least one of said ears and thereby preventing said swivel head and said ears from moving about said pivot axis with respect to each other when said shovel blade is in one of said first and second positions with respect to said handle, and an unlatching position, in which said locking and pivot shaft is displaced from said latching position interconnecting said swivel head with said at least one of said ears, and said ears and said swivel head are free to rotate with respect to each other about said pivot axis, so that said shovel blade is free to rotate between said first and second positions, and wherein said shovel blade includes a forwardly directed flange extending along said rear margin and is also pivotable to a folded position parallel with and alongside said handle when said pivot and locking shaft is in said unlatching position and wherein, as part of said latching mechanism, said swivel head and at least one of said ears define apertures in which said locking body is received when said locking and pivot shaft is in said latching position when said shovel is in said folded position.

22. A set of firefighting tools incorporating a single handle and a plurality of interchangeable heads, comprising in combination:
(a) a substantially inflexible elongate handle having a length, a near end, and an opposite outer end;
(b) a combination tool head including a body defining a socket for receiving said outer end of said handle, the socket defining a central axis and the body including:
  (i) a first blade support structure defining a first blade seat;
  (ii) a second blade support structure defining a second blade seat;
  (iii) a first blade defining a first blade plane, mounted on said first blade seat with said first blade plane substantially parallel with said central axis;
  (iv) a second blade defining a second blade plane, mounted on said second blade seat with said second blade plane oriented approximately normal to said first blade plane; and
  (v) wherein said combination tool head has a center of mass located on said central axis;
(c) a shovel head including a shovel blade defining a rear margin and having a pair of opposite lateral edges and a shovel blade mounting assembly including a handle extension, for detachably attaching said shovel blade to said outer end of said handle and defining a pivot axis extending transversely with respect to the length of said handle and generally parallel with said rear margin of said shovel blade, said shovel blade being pivotable about said pivot axis between a first position in which said shovel blade extends away from said handle extension and said lateral edges extend generally at an angle in the range of about 15°–30° with respect to said handle extension, and a second position in which said lateral edges extend substantially perpendicular to said handle extension, said shovel blade mounting assembly including a latching mechanism for holding said shovel blade in a selected one of said first and second positions, said latching mechanism including:
  (i) a pair of parallel ears extending from a first one of said handle extension and said shovel blade, each of said ears defining a shaft-receiving aperture therethrough and at least one of said shaft-receiving apertures being a noncircular latching hole;
  (ii) a swivel head extending from the other one of said handle extension and said shovel blade and located between said parallel ears, said swivel head defining a through-hole;
  (iii) a combined locking and pivot shaft extending through said through-hole;
  (iv) a spring acting on said combined locking and pivot shaft and thereby biasing said combined locking and pivot shaft toward a latching position with respect to said ears and said swivel head;
  (v) said combined locking and pivot shaft including at least one noncircular locking body portion engaged with said swivel head; and
  (vi) said locking and pivot shaft having a length and being movable longitudinally, between said latching position, in which said locking body portion of said locking and pivot shaft engages said through-hole in said swivel head and said latching hole of at least one of said ears, thereby interconnecting said swivel head with said at least one of said ears and thereby preventing said swivel head and said ears from moving about said pivot axis with respect to each other when said shovel blade is in one of said first and second positions with respect to said handle extension, and an unlatching position, in which said locking and pivot shaft is displaced from said latching position interconnecting said swivel head with said at least one of said ears, and said ears and said head are free to rotate with respect to each other about said pivot axis, so that said shovel blade is free to rotate between said first and second positions; and
(d) a fire extinguishing direct contact head including a detachable resiliently flexible outer extension portion including a female connector portion for detachably receiving said outer end of said handle, a terminal portion oppositely located on said outer extension portion, and a plurality of elongate flexible strap members attached to and extending flexibly away from said terminal portion.

* * * * *